Nov. 12, 1940. P. B. LEONARD Re. 21,622

CONTROL APPARATUS

Original Filed Aug. 5, 1936 3 Sheets-Sheet 1

INVENTOR
PAUL B. LEONARD
BY
Warren H. F. Schmiedeing
ATTORNEY

CONTROL APPARATUS

Original Filed Aug. 5, 1936 3 Sheets-Sheet 2

INVENTOR
PAUL B. LEONARD
BY
Warren H. F. Schmiedeing
ATTORNEY

Nov. 12, 1940. P. B. LEONARD Re. 21,622

CONTROL APPARATUS

Original Filed Aug. 5, 1936 3 Sheets-Sheet 3

INVENTOR
PAUL B. LEONARD
BY
Warren H. F. Schmieding
ATTORNEY

Reissued Nov. 12, 1940

Re. 21,622

UNITED STATES PATENT OFFICE 21,622

CONTROL APPARATUS

Paul B. Leonard, Cuyahoga Falls, Ohio, assignor to Ranco Incorporated, Columbus, Ohio, a corporation of Ohio Original No. 2,202,294, dated May 28, 1940, Serial No. 94,411, August 5, 1936. Application for reissue June 20, 1940, Serial No. 341,580

26 Claims. (Cl. 200—83)

My present invention relates to switches and more particularly to an electric switch.

One of the objects of my invention is to provide a switch in which the "break," or separation, between the contacts is relatively wide in relation to the movement of the actuating mechanism.

Another object is to provide a constant, high, contact pressure at the instant before separation of the contacts, to eliminate chattering and subsequent arcing of the contacts.

A further object is to provide a snap action device that operates through the resultant force components of opposing springs to produce positive snap action without the usual "graduating" tendency.

Other and further objects and advantages will be apparent from the following description, reference being had to the accompanying drawings wherein a preferred form of embodiment of the present invention is clearly shown.

Figure 10:
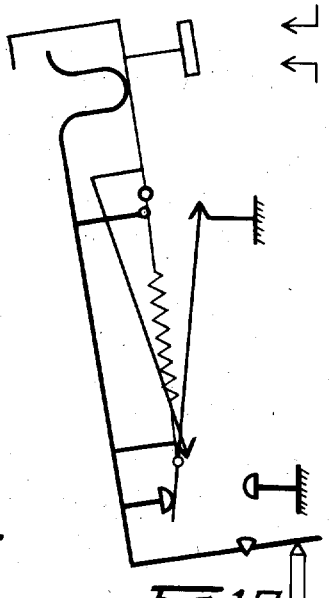
Figure 11:
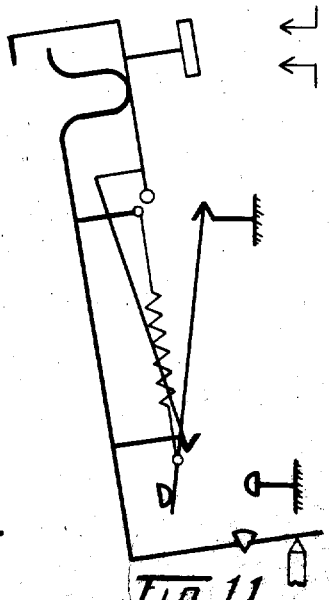

Fig. 10 is a diagrammatic view of the mechanism with spring 21 removed and with the contacts in an open position, and, Fig. 11 is a similar view to Fig. 10 with spring 22 removed and spring 21 in position.

The embodiment of the switch as shown in the drawings includes a frame or housing 20. A base 19 supports a snap mechanism and a bellows housing 18. A bellows 17 is mounted within the housing 18.

The housing 18 with the enclosed bellows 17 is rotatable when the switch is permanently mounted. To allow this movement, the housing 18 is provided with a flange, or abutment, at its upper end, which is clamped to the base plate 19 by a removable collar 1, held in place by screws 31. This collar 1 does not clamp the housing 18 so tightly that it can not be turned manually, but neither is there any appreciable end play. This attachment allows rotation of the housing 18, together with the enclosed bellows 17, without changing the relative position of the bellows 17 to the associated mechanism. An elbow 16 or other convenient means is used to engageably attach the bellows 17 to the pressure system, which may be an air or steam line, or other type of conduit, or the bellows may be connected to a bulb and tube as is familiarly used in refrigeration controls. A change of pressure within the bellows 17 acts to vary its length, which variation is transmitted to the snap mechanism by a push rod 15.

Rod 15 acts against a lever 14, which is U-shaped at the lower end, at the bearing point 32. The bearing 32 is formed by a depression in the lever 14 to receive the conical end of the rod 15. The lever 14 is the actuating lever for the switch mechanism and is pivoted at its lower end on the knife edge bearing of a rod 32, which in cross section resembles a sector of a circle. The rod 23 is set in apertures 26 formed in the bracket 5. These apertures 26 are of similar shape to the cross section of the rod 23. The bracket 5 is substantially U-shaped at its lower end and is permanently attached to the base plate 19. The bearings 36 in the actuating lever 14 are also in the shape of a sector of a circle, but with a greater degree arc than is used in the bracket 5. This additional arc allows the necessary space for the movement of the lever 14 with respect to the bearing rod 23. The lever 14 is held tightly against the push rod 15 by the tension of a spring 13, attached to the lever 14 at 37 and adjustable through the screw 12 which turns in a plate 33. It will be noted that the plate 33 is provided with a projection 34 that is slidably engaged with a slot 35 in the frame 20. This engagement allows longitudinal adjustment of the plate 33 and attached spring 13 by the action of the screw 12, without the plate 33 turning, or otherwise becoming disengaged from the spring 13. The screw adjustment 12 varies the tension of the spring on the actuating lever 14 thereby changing the pressure exerted through the associated pin 15 on the bellows 17. This change in pressure varies the adjustment of the device. The projection 34 of plate 33 extends through frame 20, and is used as an indicator for the setting of the spring 13.

Figure 4:
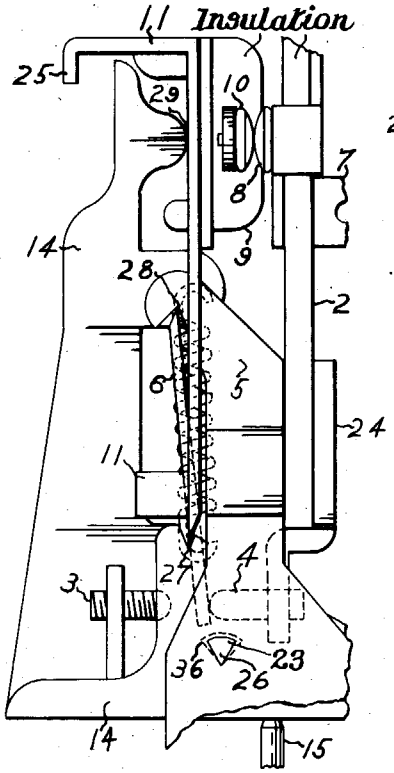
Fig. 4 is an enlarged side view of the snap mechanism with the contacts in the closed position.
Figure 3:
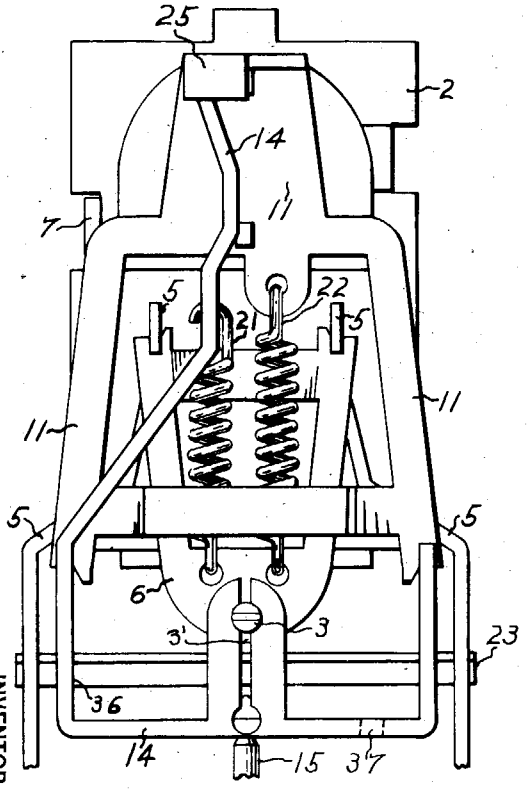
Fig. 3 is an enlarged front view of the snap mechanism.

The lever 14 cooperates at its upper end with a lever, or movable contact element 11, that carries the movable contacts 10 loosely set in an insulating member 9, attached to the contact element 11. The movable element 11 engages, on closing, with the fixed contact member 8, which may be connected to the electrical circuit by associated lugs 7. The contact 8 is set in insulating material 2 which is secured to the bracket 5 by the member 24. The lower end of movable element 11 forms a knife edge which is pivoted on the lever 14 at the bearing 27. This construction may be more clearly seen in the enlarged views shown in Figs. 3, 4 and 5, where the relationship of parts is well illustrated.

The upper or free end of lever 14 is connected to the free end of a toggle, or flipper member 6 by the spring 21. The toggle 6 is supported at its upper, pivoted end in a knife edge or V-shaped bearing 28 which is formed in the fixed bracket 5. The lever 11 is also connected to the free end of the toggle 6 by the spring 22. The movement of the free end of the toggle 6 is limited and adjustable in both directions by the screw stops 3 and 4. Stop 3 is mounted on the lever 14; this particular construction is not limiting, but merely the most obvious method of manufacture. Stop 4 is screwed through the member 24 which is associated with the support bracket 5 by rivets. The screw 3 (see Fig. 3) is engaged through the threaded hole 3' in lever 14. This hole 3' is in the elongated spring slot which provides for a tight thread at all times without the use of a lock nut. Screw 4 is similarly engaged. These two stops 3 and 4 furnish the differential range adjustment for the instrument. It is evident that by limiting the free movement of the toggle 6 that the differential of the device may be varied within any reasonable limits.

The pivotal mounting of member 11 on lever 14 is important to the success of my invention. As the lever 14 shifts in position, as occasioned by movement of the bellows 17, the fulcrum 27 for lever 11 moves towards the dead center position of the toggle member 6 and the movable element 11. This action tends to reduce the bellows movement necessary to secure operation of the snap mechanism.

The pivotal mounting of lever 11 on lever 14 has another advantage from an electrical standpoint. As the lever 14 moves, its fulcrum point 27 also moves, but since this fulcrum point 27 is not on the same center as the fulcrum point 36, of the lever 14, the fulcrum 27 described an arc as it moves. This path of movement rubs, or wipes the contacts 10 against the contacts 8 which keep the surfaces of the contacts from sticking just before the separation of the contacts.

Figure 1:
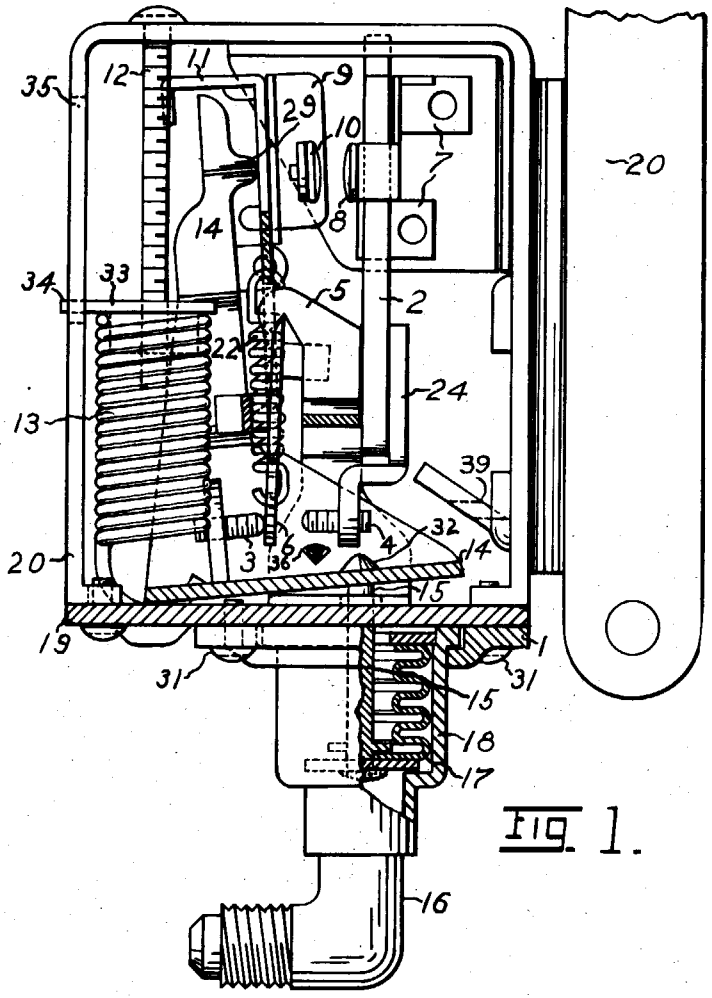
Fig. 1 is a side elevational view of the switch.
Figure 2:
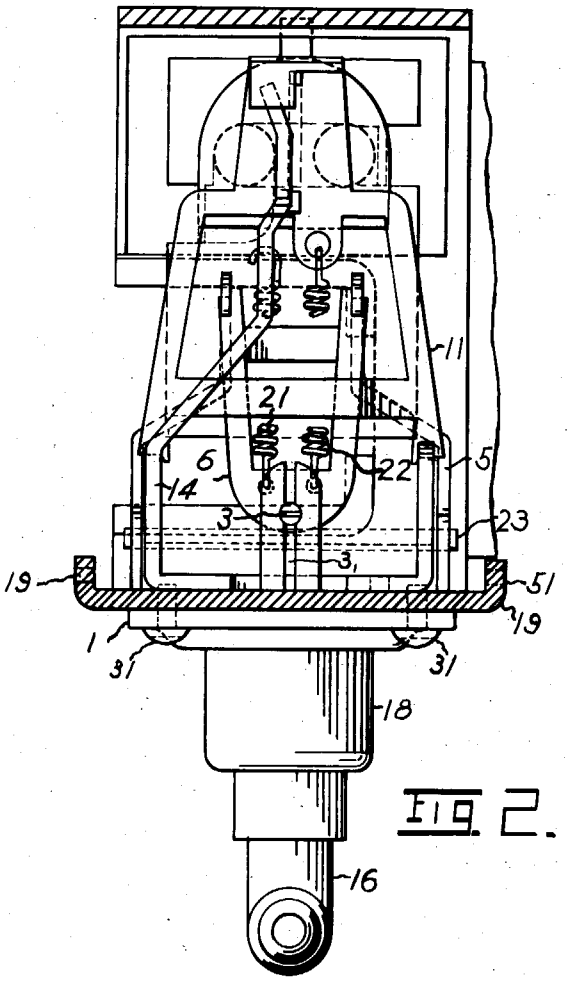
Fig. 2 is a front elevational view of the switch having the housing cut away and the adjustment spring removed.
Figure 5:
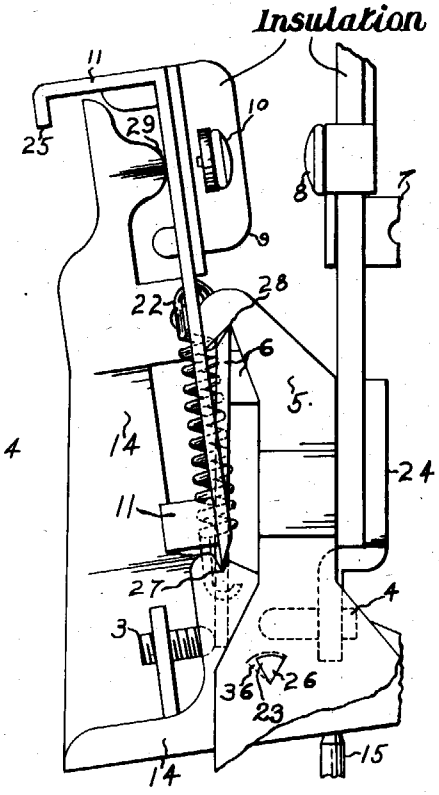
Fig. 5 is a similar view of Fig. 4 with the contacts in the open position.

At the start of the closing cycle, the switch is in the position shown in Fig. 5 with the projection 29 serving as a stop for the outward movement of lever 11. As lever 14 moves to close the switch, due to a decrease in bellows pressure, the stop 29 on the lever 14 moves lever 11 clockwise so that it approaches its dead center position. This movement simultaneously displaces the spring 21 that is attached to the lever 14 and to the flipper 6. When spring 21 and flipper 6 pass the dead center position, the spring 21 snaps the flipper 6 from stop 3 to stop 4; this movement also carries the spring 22 to the right of the dead center position for lever 11, and lever 11 will snap from stop 29 to the contacts 8 and the switch will be closed. This snap action of lever 11 and flipper 6 is substantially instantaneous. At practically the same instant lever 14 will follow through, due to the change in pull of spring 21 caused by the change in the position of flipper 6 from stop 3 to stop 4, to hit against the lever 11 and greatly increase the closing contact pressure.

On opening the device, the spring 21 overcomes the spring 22 to snap the toggle open before the lever 14 contacts the projection 25 on lever 11; neither is the point 29 in contact with the lever 11. This allows for additional movement of free travel on the separation of the contacts. The projection 25 is placed on lever 11 to engage lever 14 if for any unforseen reason the contacts do not separate. This is an added measure of safety. In this event, the direct contact of the levers 11 and 14 cooperate to force the separation of the contacts. It will be noted that in this position the pressure within the bellows is acting directly on the lever 11 through lever 14 without any intervening members being actuated. Similarly, on the closing of the device, the actuating member 14 through its integral projection 29, bears or acts directly on the movable member 11. Thus, during closing of the switch, the action is direct from the bellows through lever 14 to the movable member 11 without the intervening action of the toggle mechanism, which does not come into operation until this movable member 11 passes its dead center position. At this point the flipper 6 is snapped through dead center to snap the movable member 11 to the closed position. It will be noted that the contact separation is relatively small at the instant before the closure of the contacts, whereas the contact separation is relatively great on the opening. This relation between the contacts is very desirable as a "wide break" prevents arcing, etc., when the switch opens.

The leverage ratio of the actuating lever 14 is relatively high and may be utilized due to the construction of the switch, which does not have a graduating tendency at the instant before separation of the contacts but maintains the high contact pressure until the contacts are separated by the snap mechanism. Therefore, the movement of the upper end of the actuating lever 14 is relatively large compared to the movement of the lever or bellows end of the lever. Thus for a short bellows movement a wide separation of the contacts may be obtained.

The snap action of the device is acquired by the action of the two snap springs 21 and 22 cooperating with the movable contact lever 11, the actuating lever 14, and the flipper 6. The spring 22 connects the movable contact member 11 to the flipper member 6. The tension of the spring 22, through its horizontal component of force, tends to press the movable contacts 10 to the fixed contacts 8, in the closed position of the switch. The spring 21 connects the flipper 6 to the actuating member 14. The spring 21 is preferably heavier than the spring 22.

Figure 6:
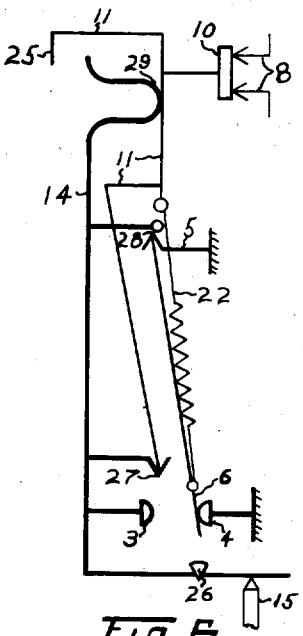
Fig. 6 is a diagrammatic view of the mechanism in the closed position with spring 21 removed.
Figure 8:
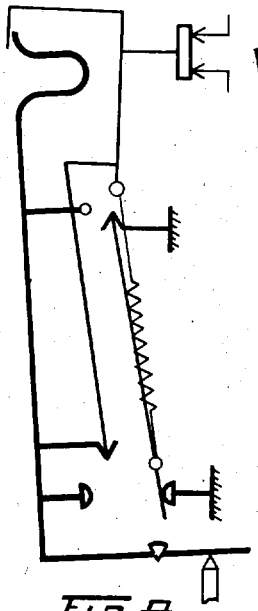
Fig. 8 is a diagrammatic view of the mechanism with spring 21 removed and shown in the position at the instant before the separation of the contacts.
Figure 7:
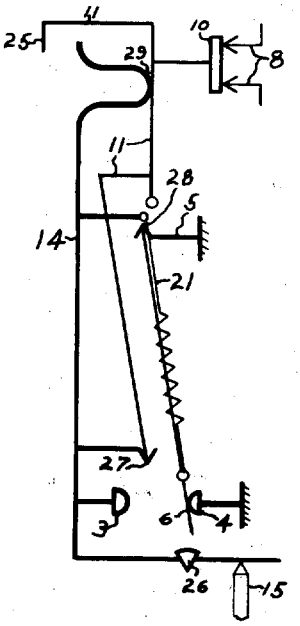
Fig. 7 is a view similar to Fig. 6 with spring 22 removed and spring 21 in place.
Figure 9:
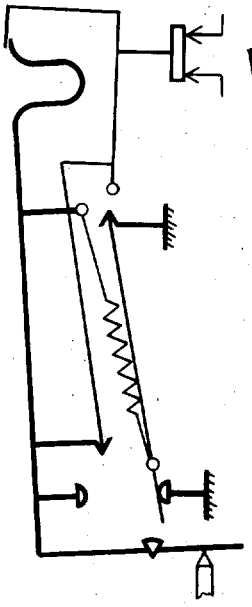
Fig. 9 is a similar view to Fig. 8 with spring 22 removed and spring 21 in place.

Figs. 6 to 11, inclusive, illustrate diagrammatically the action of the springs and toggles as the switch is actuated for separation of the contacts. In Fig. 6 the contacts are shown in closed position, and for the sake of clarity, spring 21 is removed, since springs 21 and 22 superimpose on one another in the side view of the switch. Fig. 7, therefore, is an identical view to Fig. 6, but showing the spring 21 and omitting spring 22. Figs. 8 and 9 are similar views at the instant before separation of the contacts.

As the actuating member 14 moves counter clockwise from the position shown in Figs. 6 and 7, due to the expansion of the bellows, it displaces the spring 21 from the position shown in Fig. 7 to the position shown in Fig. 9. Although at the time lever 14 moves the spring 21 beyond its dead center position, with respect to flipper 6, the flipper 6 is not displaced at that instant due to the opposing force of spring 22. At the instant that the horizontal component of spring 21 exceeds the horizontal component of spring 22, the flipper will be snapped from the stop 4 to stop 3. Figs. 8 and 9 show the position of the elements at the instant that the force of spring 21 is equal to the force of spring 22. At the instant that the force of spring 21 overcomes the force of spring 22, the flipper 6 is snapped through its own dead center and the elements are moved from the position shown in Figs. 8 and 9 to the position shown in Figs. 10 and 11. Let us assume that the switch is in the position shown in Figs. 6 and 7 and, for example, spring 22 has a horizontal force component of ten pounds, the spring 21 having a horizontal force component of five pounds in the opposite direction. The resultant force component tending to keep the flipper 6 in its original position against stop 4, will be five pounds. As the spring 21 is displaced to the position shown in Fig. 9, its horizontal force component increases to a point where it is ten pounds in the opposite direction of the ten pound component of spring 22. This gives a resultant force of zero of the flippers against stop 4.

The instant that the component of force of spring 21 exceeds ten pounds, it will snap the flipper 6 through the dead center position of the latter. Due to this movement of flipper 6, the angularity between the flipper 6 and the spring 21 is constantly increasing to produce a correspondingly constant increase in the horizontal force component of the spring 21. This constantly increasing component of force of spring 21 insures contact separation, which separation is constantly increasing in speed from the very start to the completion thereof.

The contact pressure of contact 10 on contact 8 is unchanged until snap action occurs. Fig. 8 illustrates very clearly why the contacts have a maximum pressure even at the instant before separation, for it will be noted that the horizontal component force of spring 22 at its upper end as exerted on contacts 10 is unchanged during the movement of spring 21.

The present switch presents a device with positive spring action to assure constant, high, contact pressures and positive "make" and "break" of the points, thus providing perfect switch operation, entirely devoid of chattering or arcing. The movable contacts 10, due to their loose engagement with the insulating member 9 having a slight "wiping" action on closing. This is also advantageous for perfect operation.

My present invention has numerous distinct advantages over snap action devices of the usual design. It is a well known fact that switches and the like, having small differentials in their operating ranges usually have a very limited movement between the switch points.

My invention differs from the usual switch in that compensating adjustments, automatic in character, are provided, that not only allow a very small differential range, but also allow an exceptional "break," or movement of the points.

This relatively large break is made possible by the "lost motion" and movable fulcrum features of the invention. In order that this "lost motion," which allows wider separation of contacts, does not increase the differential, the compensating movable fulcrum is provided for the movable contact member. The movement of the fulcrum points disposes the lever 11 in position to snap with no additional travel of the bellows. In other words the displacement of the fulcrum, for the movable member, takes up the "lost motion."

Although the description of my invention is directed to electrical switches, it is to be understood that the principles involved should not be limited to use in these specific devices. It is evident that the benefits derived from the described mechanism, namely, a relatively large movement of the snap member for a relatively small movement of the actuating medium, would be well adapted for use in a number of devices completely divorced from electrical switches. The inherent advantages involved would, for example, be well employed in valves of the snap action type, for use with fluids of various kinds, whether such valves or mechanisms are actuated by the described bellows or by such other well known mediums as bimetal, rod and tube expansion elements, etc.

In fact, the described mechanism will be extremely useful in any type of device where a strong, definite action or movement is required under low differential conditions.

While the form of embodiment of the present invention as herein disclosed constitutes a preferred form, it is to be understood that other forms might be adopted, all coming within the scope of the claims which follow.

I claim as my invention:

1. In a snap action device, a movable element, a flipper fulcrumed at one end, a spring connecting the movable element and the flipper, an actuating member, a spring connecting the actuating member to the flipper, stop means disposed to contact the free end of the flipper and means for moving the actuating member.

2. In a snap acting device, relatively fixed and movable elements, a snap member, an elastic means cooperating with said movable element and said snap member, an actuating member, a resilient means connecting said actuating member and snap member, said snap member, resilient means and actuating member having a dead center position, said actuating member being so disposed in relation to the snap member that when the dead center position of the snap member is passed that both the elastic means and the resilient means react cooperatively to move the movable element.

3. A snap acting device comprising, a movable element to be actuated, a flipper, a spring connecting the movable element and the flipper, an actuating member, a spring connecting the actuating member to said flipper and means for moving the actuating member.

4. A snap acting device comprising a movable element to be actuated; a flipper fulcrumed at one end; a spring having one end thereof connected with the free end of the flipper and having the other end thereof connected with the element, said spring, flipper and element having a dead center position; an actuating member; a spring connected with the actuating member and with the free end of said flipper, said last spring, actuating member and flipper having a dead center position and said last spring being adapted to move the flipper beyond its dead center position with respect to the first spring, flipper and first element when the second spring is moved beyond its dead center position relative to the flipper and actuating member; and means for moving the actuating member.

5. In a snap acting device, a movable element to be actuated, a flipper fulcrumed at one end; a spring having one end connected to the free end of the flipper and having the other end connected with the element, said spring, flipper and element having a dead center position, an actuating member carrying a fulcrum for said movable element; a second spring connected with the actuating member and flipper, said flipper, actuating member and spring having a dead center position, said actuating member being adapted to move the movable element and the second spring toward the dead center positions; and means for moving the actuating member.

6. In a snap acting device, a movable element to be actuated; a flipper fulcrumed at one end; a spring having one end connected to the free end of the flipper and having the other end connected with the element; said spring, flipper and element having a dead center position; an actuating member carrying a fulcrum for said movable element; a spring connected with the actuating member and with the free end of said flipper, said last spring, actuating member and flipper having a dead center position, said actuating member being adapted to move the movable element toward its dead center position, said last named spring being adapted to move the flipper beyond its dead center position with respect to the first spring, flipper and first element when the second spring is moved beyond its dead center position relative to the flipper and actuating member; and means for moving the actuating member.

7. In a snap acting device, a movable element to be actuated; a flipper fulcrumed at one end; a spring having one end connected to the free end of the flipper and having the other end connected with the element; said spring, flipper and element having a dead center position; an actuating member carrying a fulcrum for said movable element; a spring connected with the actuating member and with the free end of said flipper, said last spring, actuating member and flipper having a dead center position, said actuating member being adapted to move the movable element toward its dead center position, said last named spring being adapted to move the flipper beyond its dead center position with respect to the first spring, flipper and first element when the second spring is moved beyond its dead center position relative to the flipper and actuating member; and means for moving the actuating member.

8. In a snap acting device, relatively stationary and movable elements to be controlled; an actuating member, said movable element adapted to be limited in its movement in one direction by the stationary element and adapted to be limited in its movement in the other direction by the actuating member, said movable element and actuating member being spaced from one another for free travel of the movable element; a flipper; a spring connected with the flipper and the movable element, said second spring, flipper and element having a dead center position, said spring being adapted to snap actuate the movable element when the spring, flipper, and movable element are moved beyond their dead center position; and a second spring connecting the flipper and the actuating member, said second spring, flipper and element having a dead center position, said second spring being adapted to snap actuate the flipper beyond the dead center position of said first spring, flipper and movable element when the actuating member moves beyond its dead center position with respect to the flipper and second spring.

9. In a snap action device, a plurality of levers, yielding means interconnecting one of said levers to each of two other levers, said yielding means having unequal and opposing force components, means to actuate one of said second levers to increase the force components of one of said means whereby snap action occurs when the increasing force component exceeds the stationary force component of the other means.

10. In a snap acting device, a plurality of pivoted elements having their free ends disposed oppositely from one another, a spring connecting said elements for urging the free ends in one direction when the spring is in one position, a second spring connected to one of said elements for moving the elements in the opposite direction, and means for increasing the force of the second mentioned spring on the one element for overcoming the force of the first mentioned spring on the element.

11. In a snap acting device, a movable element, resilient means for urging the element in a certain direction, said element and means being so disposed with respect to one another that the component of force of said means acting upon the element decreases when the element is moved in opposition to said means, a spring tending to move said element in a direction opposite the said certain direction, and means for moving the spring to increase the force of said spring to a point at which it overcomes the force of the first mentioned means.

12. In a snap acting device, a first movable member and a second movable member; a fixed support for the first movable member; an overcenter spring interconnecting the said movable members; an operating member; a fulcrum for said second movable member carried by the operating member; a spring interconnecting the operating member and said first movable member for actuating the first movable member to move the first mentioned spring over dead center on movement of the operating member to cause snap action of the first and second movable members; and means for actuating the operating member.

13. In a snap acting device, a movable member; a snap member fulcrumed at a fixed point; elastic means cooperating with the movable member and the snap member, said movable member having a dead center position with respect to the elastic means and the snap member; an actuating member, said actuating member carrying said movable member; resilient means cooperating with the snap member and the actuating member, said actuating member causing said resilient means and said snap member to be moved past the dead center position of said movable member, elastic means and snap member for snap actuating the movable member.

14. In a snap acting device, an element movable between two extreme positions; a translatable resilient member for moving the element between the said positions; means for translating the resilient member for moving said element from one of the extreme positions to an opposite extreme position including a second resilient member for urging the first resilient member toward the second mentioned extreme position with respect to the element; and means for reversing the directions of force of the second resilient member on the first member for moving said first member in opposite directions.

15. In a snap acting device, an element movable between two positions, said element having a pivot; a resilient member connected to the element for biasing said element in either of said positions, said member being movable to a position on either side of a line through the pivot and the point of connection of the member and element; means, including a second resilient member, for yieldingly moving the first resilient member from one side of the said line to the other; and means for increasing the yielding effect of the second resilient member on the first member for moving said first member.

16. In a snap acting device, a movable element having a pivot; a spring connected to the element and being movable to a position on either side of a line through the pivot and the point of connection of the spring and element for actuating the element; means for moving the spring, including, a member connected to the spring and biased in one direction by the spring, and a second spring connected to the member for biasing the member in the opposite direction and means for moving the second spring relative to the member for increasing the biasing effect of the second spring whereby the member is moved in said opposite direction with a snap movement and moving the first spring therewith.

17. In a snap acting device, a movable element; means for limiting movement of the element between two positions; a translatable resilient member connected to the element; means for limiting movement of the resilient member between two positions; means for translating the resilient member for causing said element to be moved from one of its positions to the other, including, a second resilient member for urging the first mentioned resilient member from one of its said positions to the other; and means for reversing the directions of force of the second resilient member on the first member for moving the first member in either direction.

18. In a snap acting device, a movable element having translatable pivot; stop means for limiting movement of the element in one direction; snap mechanism for moving the element from the stop means, including a spring and a movable member, said spring connecting the element and the member and being disposed so that the moment of force thereof is at an angle with respect to a line from the pivot to the stop means to yieldingly urge the element against the stop means; an actuating member for moving the pivot to increase the angle between the spring and the said line while the actuating member moves in one direction; and means for shifting the spring to a position in which the moment of force thereof is opposite the pre-shifted position thereof for moving the element away from the stop means, said shifting means comprising snap acting mechanism including said movable member actuated by the actuating member after said actuating member moves a predetermined distance in said one direction.

19. In a snap acting device, a movable element; stop means for limiting movement of the element between two opposite positions; a spring connected to the element, said spring being adapted to move the element from one of said positions to the other; a second spring connected to the element for yieldingly retaining the element in either of said positions; and means for actuating the first spring for overcoming the yielding effect of the second spring and move the element to the opposite position.

20. In a snap acting device, an element movable in two directions; a stop limiting the movement of the element in one of said directions and a stop limiting the movement of the element in the other of said directions; means for moving said element from one stop to the other with a snap movement; and means cooperating with said means for moving one of said stops relative to the other stop prior to snap movement of the element in the said one direction for increasing the snap movement of the element in the one direction and for moving said stop relative to the other stop prior to snap movement of the element in the said other direction by said snap means for decreasing the movement of the element in said other direction.

21. In a snap acting device, a pivoted element movable about its pivot in two directions; a stop limiting movement of the element in one direction and a stop limiting movement of the element in the other of said directions; snap acting means actuatable for moving said element from one stop to the other; and a member for actuating the snap acting means, said member being adapted to move one of said stops relative to the other of said stops in said one direction to increase the movement of said element by the snap acting means in said one direction and to move the said one stop relative to said other stop in the said other direction for decreasing the movement of the element by the snap acting means in said other direction.

22. In a snap acting device, a pivoted element movable in two directions; a stop limiting movement of the element about its pivot in one of said directions; a movable actuating member, said member having a part for engaging said element for limiting movement of the element in the other of said directions, said actuating member, when moving, causing relative movement between said part and the stop; and snap mechanism operated by movement of said actuating member for moving said element to said limiting part and stop with a snap action.

23. In a snap acting device, a pivoted element movable in two directions; stops limiting the extent of movement of the element in said directions; snap acting mechanism for actuating the movable element; and means for actuating the snap actuating mechanism in opposite directions and for actuating one of said stops relative to the other of said stops for moving the pivoted element toward said other stop when said means is operating the snap acting mechanism in a direction to move the element to said other stop.

24. In a snap acting device, a pivoted element movable in two directions; stops limiting the extent of movement of the element in said directions; snap mechanism for actuating the movable element; a lever carrying one of said stops; and means intermediate the stop and fulcrum of said lever for actuating the snap mechanism.

25. In a snap acting device, a lever movable in two directions; a stop for limiting movement of said lever in one direction; snap acting mechanism for actuating the lever including a lever and an overcenter spring connecting said levers; and means movable in one direction for moving the second mentioned lever for imparting, through the spring, snap acting movement to the first mentioned lever away from the stop, said means being movable in the opposite direction for moving the second mentioned lever for imparting, through the spring, snap acting movement of the first mentioned lever toward the stop, said means having a part engagable with the first mentioned lever, said means, when moving, causing relative movement between said part and the stop for moving said first mentioned lever toward the stop while said means is moving in said opposite direction and before the second mentioned lever is moved sufficiently to impart the second mentioned snap acting movement.

26. In a snap acting device, a lever movable in two directions; a stop for limiting movement of said lever in one direction; snap mechanism for actuating the lever including a movable member and an overcenter spring connecting the lever and movable member; means movable in one direction for moving the movable member for imparting, through the spring, snap movement to the lever away from the stop, said means being movable in the opposite direction for moving the movable member for imparting, through the spring, snap acting movement to the lever toward the stop; and means movable, relative to said stop, by the first mentioned means and engageable with the lever for moving the lever toward the stop while the first said means is moving in said opposite direction and before the movable member is moved sufficiently to impart the second mentioned snap acting movement.

PAUL B. LEONARD.